United States Patent [19]
Wang et al.

[11] Patent Number: 5,770,121
[45] Date of Patent: Jun. 23, 1998

[54] SOLID STATE COAGULATION OF OPTICAL QUALITY POLYMER THIN FILMS

[75] Inventors: Chyi-Shan Wang, Beavercreek; Jar-Wha Lee, Dublin, both of Ohio; D. Mark Husband, APO AE

[73] Assignee: The United States of America as represented by the Secretary of the Air Force, Washington, D.C.

[21] Appl. No.: 759,819

[22] Filed: Nov. 18, 1996

[51] Int. Cl.$^6$ .................................................. B29D 7/00
[52] U.S. Cl. ........................... 264/2.6; 264/203; 264/233; 264/331.12; 264/344
[58] Field of Search ........................... 264/2.6, 203, 233, 264/299, 331.12, 344, 204

[56] References Cited

U.S. PATENT DOCUMENTS

| | | |
|---|---|---|
| 4,374,977 | 2/1983 | Fujiwara et al. . |
| 4,377,546 | 3/1983 | Helminiak et al. . |
| 4,517,315 | 5/1985 | Matsumura et al. ..................... 264/344 |
| 4,537,974 | 8/1985 | Lau . |
| 4,607,095 | 8/1986 | Kuder . |
| 5,003,035 | 3/1991 | Tsai et al. . |
| 5,057,600 | 10/1991 | Beck et al. . |
| 5,064,590 | 11/1991 | Marinaccio . |
| 5,166,313 | 11/1992 | Archibald et al. . |
| 5,205,968 | 4/1993 | Damrow et al. . |
| 5,216,110 | 6/1993 | Inbasekaran et al. . |
| 5,357,040 | 10/1994 | McGrath et al. . |
| 5,387,629 | 2/1995 | McGrath et al. . |
| 5,492,666 | 2/1996 | Wang et al. . |

OTHER PUBLICATIONS

M. Dotrong, M.H. Dotrong, G.J. Moore and R.C. Evers, "Colorless Rigid–Rod Polymers Containing Bicyclo[2,2,2] Octane Moieties", Polymer Preprints, vol. 32, No. 3, Aug. 1991, pp. 201–202 (published Aug. 12, 1991).

*Primary Examiner*—David A. Simmons
*Assistant Examiner*—Kenneth M. Jones
*Attorney, Agent, or Firm*—Charles E. Bricker; Thomas L. Kundert

[57] ABSTRACT

A method for preparing optical quality, thin films of polymers and co-polymers, as well as blends of such polymers or co-polymers with flexible polymers and co-polymers which comprises (a) preparing a solution of the polymer or co-polymer or blend in a suitable solvent;
(b) forming a film from the solution;
(c) cooling the thus-formed film to a temperature below the freezing point of the solvent; and
(d) dissolving the solvent out of said film at a temperature below the melting point of the solvent.

This method can be employed to prepare films of high optical clarity for electro-optical device applications. Because of their thermal stability, mechanical strength and chemical resistance, films prepared according to this method can also be used as filters and separation membranes.

15 Claims, 4 Drawing Sheets

SOLID STATE COAGULATION OF OPTICAL QUALITY POLYMER THIN FILMS

RIGHTS OF THE GOVERNMENT

The invention described herein may be manufactured and used by or for the Government of the United States for all governmental purposes without the payment of any royalty.

BACKGROUND OF THE INVENTION

The present invention relates to the preparation of optical quality polymer thin films.

In the past several years, nonlinear optics has emerged as a new frontier of scientific research for technological development of photonics by which information may be acquired, stored, processed and transmitted through photons. Organic polymers typically have the desirable mechanical integrity, flexibility, light weight, low linear optical loss, and low temperature solution or melt processibility. Interest in highly conjugated polymers for nonlinear optical applications stems from the potential combination of the typical polymer properties with the unique electronic and optical characteristics of conjugated polymers. Their π-electron delocalization can lead to large optical nonlinearities and their femtosecond response time is by far the fastest compared to inorganic materials and multiple quantum wells.

One group of polymers of particular interest are the para-ordered heterocyclic aromatic polymers. This group, commonly referred to as rigid-rod or rigid-chain polymers, has repeating units of the general formula —(—Z—Ar—)—, wherein Z is benzobisazole group and Ar is a para-oriented aromatic moiety, such as 1,4-phenylene, 4,4'-biphenylene, 4,4'-diphenylsulfide, 4,4'-diphenylether or the like. Thus, the group includes poly(p-phenylene benzobisoxazole) (PBO), poly(p-phenylene benzibisthiazole) (PBT) and poly(p-phenylene benzobisimidazole) (PBI) polymers and co-polymers, as well as substituted derivatives thereof.

The preparation and processing of rigid-rod polymers and co-polymers is well known in the art. They are commonly prepared by the condensation of at least one di- or tetra-amino monomer with at least one para-oriented dicarboxylic acid monomer in a strong acid such as polyphosphoric acid (PPA). The polymer or co-polymer is commonly recovered from the reaction mixture by precipitation in water. In this context, the term 'coagulation' is often used interchangeably with 'precipitation'. The polymer or co-polymer can be formed into desirable shapes by directly extruding the PPA mixture into water. Alternatively, the polymer or co-polymer can be coagulated or precipitated into water, washed, dried and then taken up in a strong acid, such as sulfuric acid or methanesulfonic acid (MSA), then extruded, cast or spin-cast into desirable shapes followed by coagulation in water.

Rigid-rod polymers and co-polymers generally have very high thermal stability, high mechanical strength and low solubility in ordinary solvents. These polymers and co-polymers generally have melting temperatures higher than their thermal degradation temperatures; thus, they cannot be processed by melt-processing techniques. As noted previously, they are normally processed into desirable shapes by extrusion, casting or spin-casting from a strong acid solution, such as from a methanesulfonic acid or polyphosphoric acid solution.

Optical quality thin films of PBT have been fabricated by coagulation in water from solutions in MSA or PPA and by spin-casting from organic solvents, with Lewis acids. Over the years, the third-order nonlinear optical susceptibility, $\chi^{(3)}$, of PBT thin films showed significant increase from $6\times10^{-12}$ to $4.5\times10^{-10}$ esu. In the conventional extrusion and coagulation process used for making rigid-rod films, the films normally show four types of defects: (a) large voids of about 20 µm size, (b) small particles of about 1 µm size, (c) lines parallel to the direction of extrusion and (d) lines transverse to the direction of extrusion. These defects are believed to significantly contribute to the optical loss of the rigid-rod polymer films.

Helminiak et al, U.S. Pat. No. 4,377,546, issued Mar. 22, 1983, disclose a method for preparing a molecular composite film comprising the steps of forming a solvent mixture of methanesulfonic acid and a polymer mixture of rod-like, aromatic heterocyclic polymer and an amorphous, coil-like, aromatic heterocyclic polymer, casting the solvent mixture and exposing the resulting polymer layer to water vapor for a period of time sufficient to form a precipitated film. When used with a solvent mixture of methanesulfonic acid and a rod-like, aromatic heterocyclic polymer, this method provides films free of large voids. However, the resulting films had very poor optical transparency.

Wang et al, U.S. Pat. No. 5,492,666, issued Feb. 20, 1996, disclose a method for preparing optical quality, thin films of rigid-rod polymers and co-polymers, as well as blends of such polymers or co-polymers with flexible coil-like polymers and co-polymers which comprises the steps of (a) preparing a solution of the rigid-rod polymer or co-polymer or blend in a suitable solvent; (b) forming a film from the solution; (c) exposing the film to a non-solvent vapor for about 1 to 5 minutes per micron thickness in the finished film; and (d) coagulating the film in a non-solvent. This method can be employed to prepare films of high optical clarity with no voids for electro-optical device applications. Because of their thermal stability, mechanical strength and chemical resistance, films prepared according to this method can also be used as filters and separation membranes.

We have discovered an improved method for preparing optical quality, thin films using a variety of polymers.

Accordingly, it is an object of this invention to provide an improved method for preparing optical quality, thin films.

Other objects and advantages of the present invention will be apparent to those skilled in the art.

SUMMARY OF THE INVENTION

In accordance with the present invention there is provided a method for preparing optical quality, thin films of organic polymers and co-polymers, as well as blends of such polymers or co-polymers with other polymers and co-polymers, hereinafter referred to as the solid-state coagulation process, which comprises the steps of:

(a) preparing a solution of the organic polymer or co-polymer, or the blend, in a suitable solvent;

(b) forming a film from the solution;

(c) rapidly cooling the thus-formed film to a temperature below the freezing point of the solvent;

(d) dissolving the frozen solvent out of the film at a temperature below the melting point of the solvent; and (e) drying the film.

DETAILED DESCRIPTION OF THE INVENTION

Figure 1:
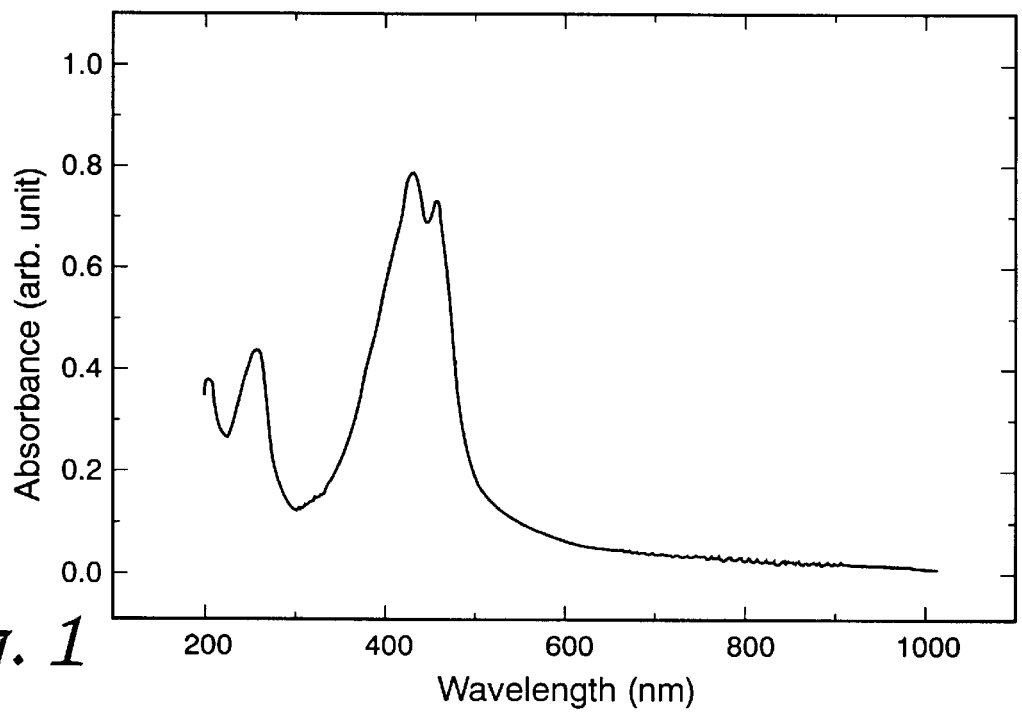
FIG. 1 is a UV/Vis/NIR absorption spectrum of a PBZT film prepared by solid-state coagulation process.

In addition to the rod-like, aromatic heterocyclic polymers and co-polymers mentioned previously, a number of other polymers can be employed to produce active or host nonlinear optical (NLO) thin films in accordance with the present invention. An active film is one which has NLO properties; a host film is one which provides support for a material having NLO properties, and which may, itself, have NLO properties. These other polymers include poly(ether ether ketones) (PEEK), poly(imidazoisoquinoline)-type ladder polymers (BBL) and aromatic polyamides, such as poly(p-benzamide) (PBA) and poly(p-phenyleneterephthalamide) (PPTA).

The active or host NLO film-forming polymers or co-polymers can be blended with flexible polymers and co-polymers such as, for example, nylon 6,6:

as well as blends with other thermoplastic and thermosetting polymers, including flexible, coil-like heterocyclic polymers. The latter are disclosed in Helminiak et al, U.S. Pat. No. 4,207,407. Generally, the weight ratio of rigid-rod polymer or co-polymer to flexible polymer or co-polymer in blends is about 5:95 to 60:40.

Second order nonlinear optical chromophores such as, for example,

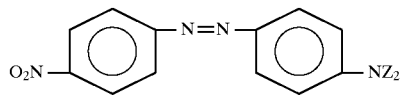

wherein Z is —H or —CH$_3$, can also be blended with the host NLO film-forming polymers or co-polymers to enhance their NLO effects.

Of particular interest are the rod-like, aromatic heterocyclic polymers and co-polymers. These polymers have a para-ordered geometry

wherein Z is

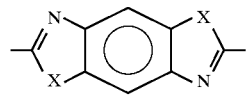

wherein X is —S—, —O— or —NH—, and wherein Ar is a para-oriented aromatic moiety, such as 1,4-phenylene, 4,4'-biphenylene, including substituted variants of each, as well as para-oriented moieties such as the following:

 and 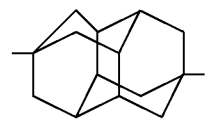

bicyclooctane (BCO)     diamantane (DA)

The co-polymers have the structure

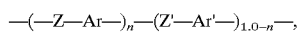

wherein Z is as defined above, Z' is a benzobisazole, generally the same as Z, Ar is as defined above, Ar' is a para-oriented aromatic moiety, different from Ar, and n is a number, ranging from 0.01 to 0.99, representing the molar portion of Z relative to Z'.

Examples of such polymers and co-polymers, which are widely described in the literature, are disclosed in Helminiak et al, U.S. Pat. No. 4,377,546 and Tsai et al, U.S. Pat. No. 5,003,035. Generally, these polymers and co-polymers have a number of repeating or recurring units such that the polymers/co-polymers have an intrinsic viscosity of at least 2 dl/g, preferably 5 to 30 dl/g, inclusive, as determined in methanesulfonic acid at 30° C.

Preparation of rigid-rod polymers containing the bicyclooctane moiety is disclosed in M. Dotrong, M. H. Dotrong, G. J. Moore and R. C. Evers, "COLORLESS RIGID-ROD POLYMERS CONTAINING BICYCLO(2,2,2)OCTANE MOIETIES", Polymer Preprints, Volume 32, Number 3, August, 1991, pp 201–202. Preparation of rigid-rod polymers containing the diamantane moiety is disclosed by Archibald et al, U.S. Pat. No. 5,166,313, issued Nov. 24, 1992.

Initially, a solution of the active or host NLO film forming polymer/co-polymer in a suitable solvent is prepared. In the case of rigid-rod polymers and co-polymers, MSA and PPA are solvents for these polymers/co-polymers. Other suitable solvents include concentrated sulfuric acid, m-cresol, and the like, as well as Lewis acids such as nitromethane with aluminum chloride or nitrobenzene with gallium chloride. Concentrated sulfuric acid is a suitable solvent for PEEK, PBA and PPTA.

Although the solution concentration can range from, for example, 0.1 percent to greater than 5 percent, by weight, we have found that for high molecular weight rigid-rod polymers, a concentration above 3 percent is so viscous as to be almost impossible to form into film by the doctor-blade method. Accordingly, we prefer to employ solution concentrations of about 0.5 to 3 percent, more preferably 1.0 percent.

The polymer solution is formed into a thin film having a thickness of about 50 to 1000 μm by extrusion, doctor-blading or spin-coating onto a suitable substrate or surface, such as glass or silicon wafer. As a rough guide, the finished film will generally have a thickness about equal to the solution thickness times the solution concentration. Thus, a 1 percent solution extruded or laid down to a thickness of about 100 microns will provide a finished film about 1 micron thick.

The thus-formed film is rapidly cooled to a temperature about 30° to 80° C. below the freezing point of the solvent to immobilize the molecular dispersion of the polymer or polymers in the solvent. Cooling of the film can be accomplished by exposing the film in an environment containing liquid nitrogen or dry ice.

The film solvent is then dissolved out of the frozen film by contacting the film with one or more non-solvents, so that the film solvent is dissolved away without disrupting the molecular dispersion of the polymer or polymers. Suitable non-solvents include the lower alkyl alcohols, such as methanol, ethanol, propanol and the like, and lower alkyl ketones, such as acetone, methyl ethyl ketone and the like. The resulting film is rinsed with non-solvent: to remove residual solvent, then dried.

Steps (c) and (d) can be effected simultaneously when a liquid of a cryogenic temperature is used to freeze and coagulate the film, because the heat conduction through such a system, which is responsible for immobilizing the molecular dispersion of the solution, occurs much faster than the mass transfer of the coagulant or non-solvent by diffusion, which is responsible for dissolving and removing the solvent.

The method of the present invention can be employed to prepare films of high optical clarity for electro-optical device applications. Because of their thermal stability, mechanical strength and chemical resistance, films prepared according to the present invention can also be used as filters and separation membranes.

The following example illustrates the invention:

EXAMPLE

Polymer thin films were prepared by doctor-blading or spin-coating a thin layer of polymer solution on a five-inch silicon wafer. The solution was then coagulated in a coagulant at a selected subambient temperature ranging from −30° to −80° C. The coagulants used were alcohols and ketones. The coagulated polymer thin films were washed thoroughly in a deionized and distilled water bath for five days and then mounted on rings cut from a one-inch glass tube. The ring-mounted thin films were allowed to air-dry for one day prior to optical characterizations. Polymer thin films were prepared from solutions of various concentrations to investigate the concentration effect on optical quality of coagulated polymer thin films. Polymer thin films of various thicknesses were prepared to differentiate the optical loss from surface reflection and that from internal absorption and scattering. The thickness of the various polymer thin films was measured with a profilometer.

The polymer thin films were examined by both transmitted and reflected optical microscopy. A poly(p-phenylene benzobisthiazole) (PBZT) thin film prepared by the solid-state coagulation process of this invention was yellowish and optically transparent. It did not contain the large voids observed in PBZT thin films fabricated by other methods. However, the film contained micron-size particles, which may be gel particles in the polymer or dust from the environment.

Figure 2:
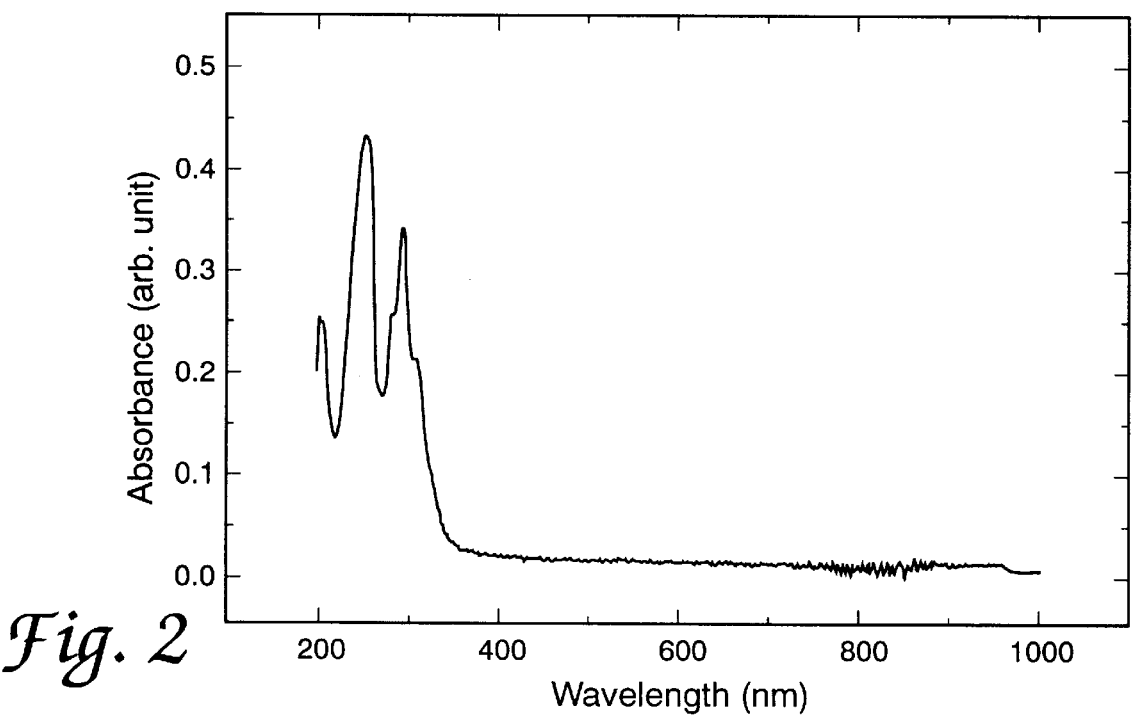
FIG. 2 is a UV/Vis/NIR absorption spectrum of BCO-PBZT thin film prepared by solid-state coagulation process.
Figure 3:
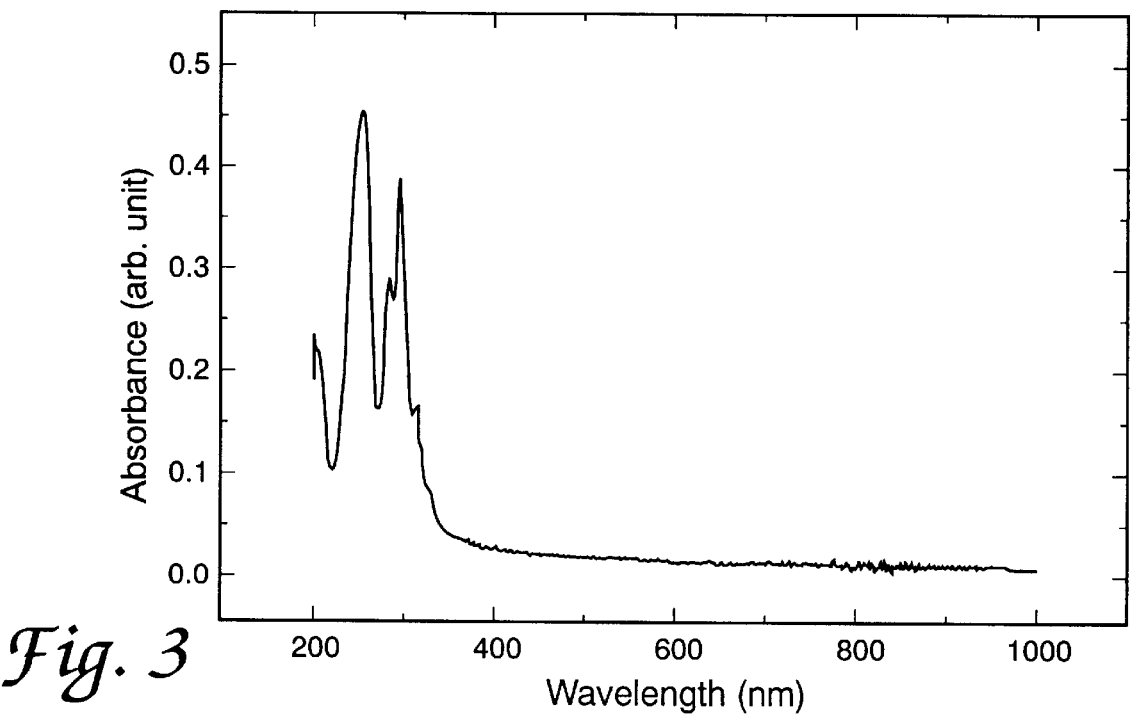
FIG. 3 is a UV/Vis/NIR absorption spectrum of DA-PBZT thin film prepared by solid-state coagulation process.

The optical absorbance and percent transmission of the various polymer films were characterized with a UV/Vis/ NIR spectrometer (Perkin-Elmer, Lambda 9). In the figures, absorbance is expressed in arbitrary units (arb. unit). The UV/Vis/NIR absorption spectrum of a solid-state-coagulated PBZT thin film (FIG. 1) reveals a transition of π electrons from a bonding (π) state to an antibonding (π*) state at $\lambda_{max}$ of 500 nm and an electronic band-gap of 2.4 eV from the absorption band edge of 560 nm. The UV/Vis/NIR absorption spectra of poly(bicyclooctane benzobisthiazole) BCO-PBZT and poly(diamantane benzobisthiazole) DA-PBZT are shown in FIGS. 2 and 3, respectively. The films do not absorb electromagnetic waves in the visible light region because of the aliphatic nature of bicyclooctane and diamantane moieties that breaks the π-electron delocalization along the otherwise conjugated polymer chain.

Figure 4:
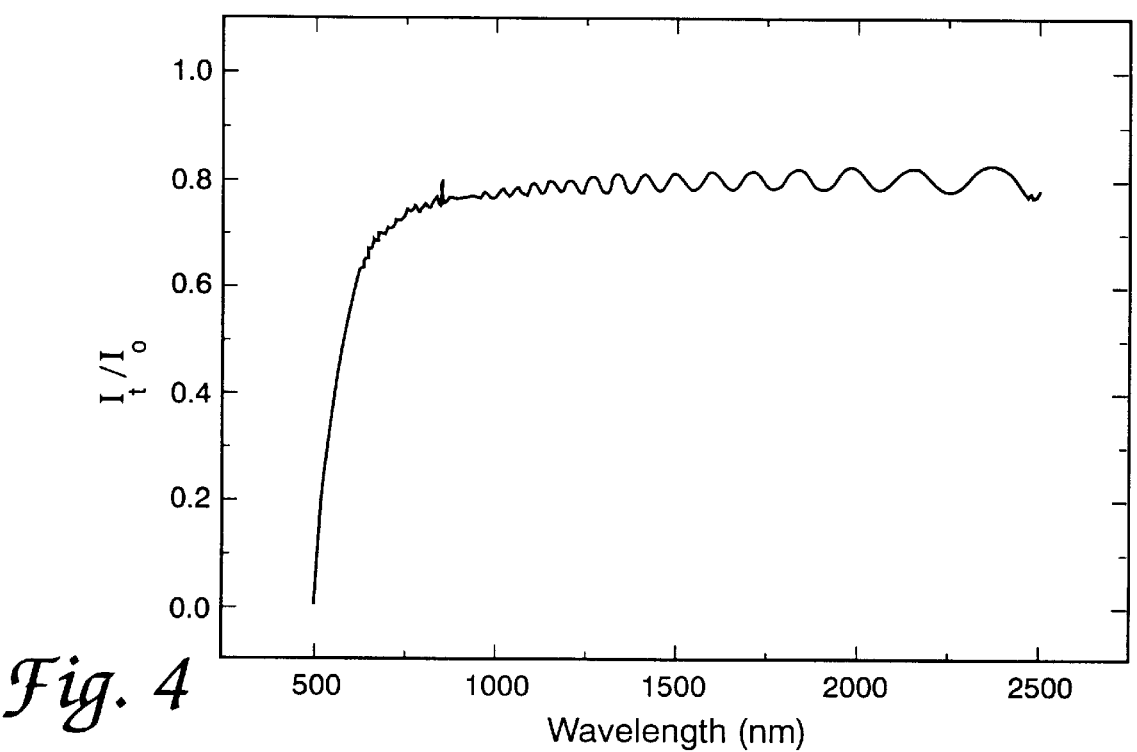
FIG. 4 is a UV/Vis/NIR transmission spectrum of a PBZT film prepared by solid-state coagulation process.
Figure 5:
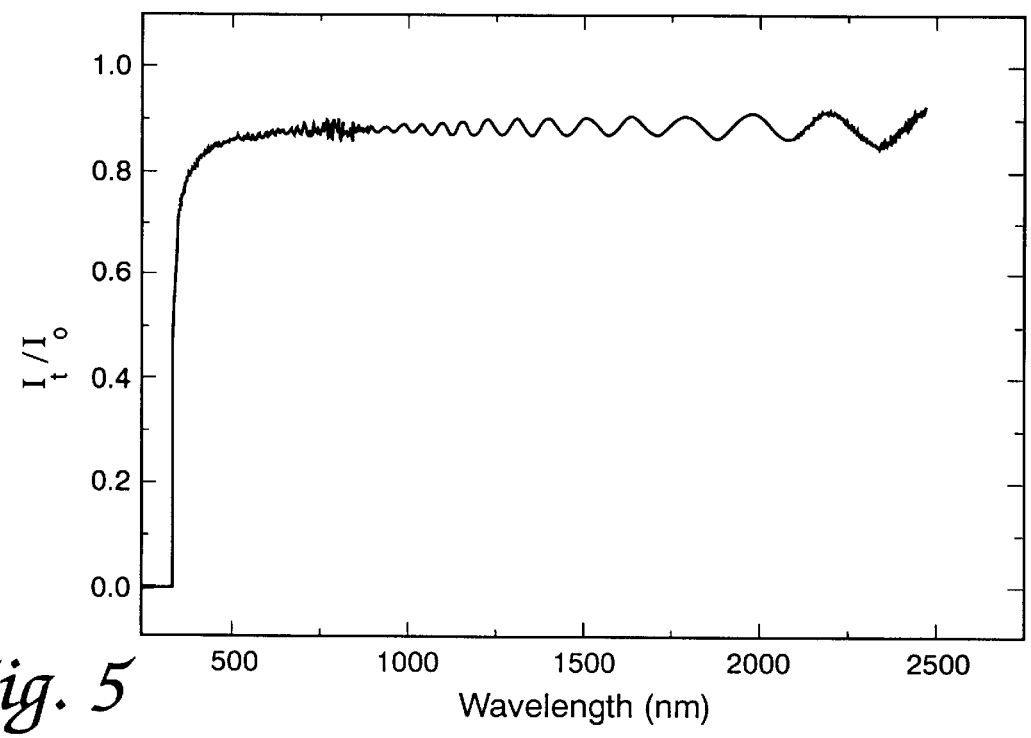
FIG. 5 is a UV/Vis/NIR transmission spectrum of a BCO-PBZT film prepared by solid-state coagulation process.

The transmitted UV/Vis/NIR spectrum of a PBZT thin film is shown in FIG. 4. The optical spectrum shows the constructive and destructive interference fringes. As a first approximation, the relative intensity of the transmitted light ($I_t$) to the incident light ($I_o$) of the PBZT thin film in relation to wavelength may be assumed to be the median between the two curves constructed respectively from the constructive and the destructive extremes of the interference fringes in the optical spectrum. Therefore, the optical transmission of the PBZT thin film can be estimated to be 80% at wavelengths greater than 1000 nm. In the long wavelength region, the optical loss is mainly from the surface reflection of the film due to the difference between the reflective indices of the film and air. A similar spectrum is observed for the BCO-PBZT thin film (FIG. 5). The optical transmission of this film is estimated to be 88% at wavelengths greater than 500 nm.

Figure 6:
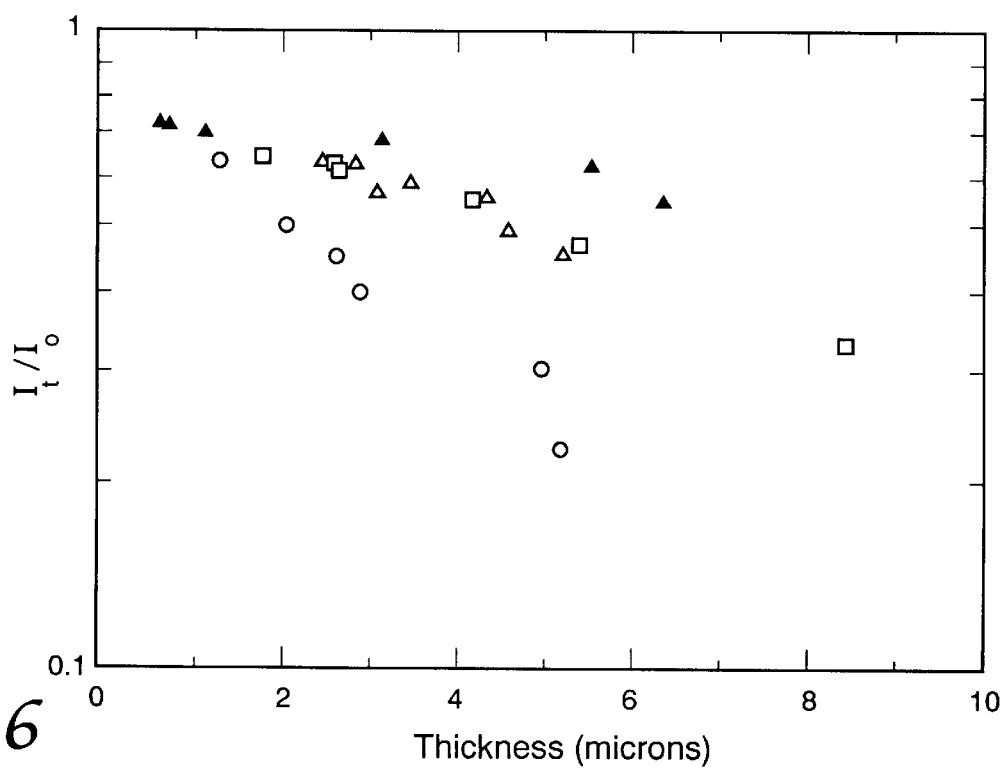
FIG. 6 illustrates percent optical transmission of PBZT thin films prepared by the solution-state coagulation process (open symbols) and that by solid-state coagulation process (filled symbols) as a function of film thickness and solution concentration: 1 wt % (○), 2 wt % (□), and 3 wt % (Δ) solutions.

The relative intensity $I_t/I_o$ obtained for the solution-coagulated PBZT thin films at 600 nm wavelength is shown in logarithmic scale in FIG. 6 as a function of solution concentration and the film thickness. Clearly, rigid-rod polymer thin films coagulated from more concentrated solutions exhibit better optical quality. This is due to the fact that in more concentrated solutions, the mobility of rigid-rod molecules is more restricted so the degree of phase separation from coagulation is less significant than that in more dilute solutions. However, the improvement in optical transparency is marginal when the polymer concentration is increased from 2 to 3 wt %. Also included in FIG. 6 are the optical transmissions of the PBZT thin films prepared by solid-state coagulation from the 3 wt % solution (filled triangle). It is clear that films prepared by the method of this invention have superior optical transparency to those prepared by solution-state coagulation.

Figure 7:
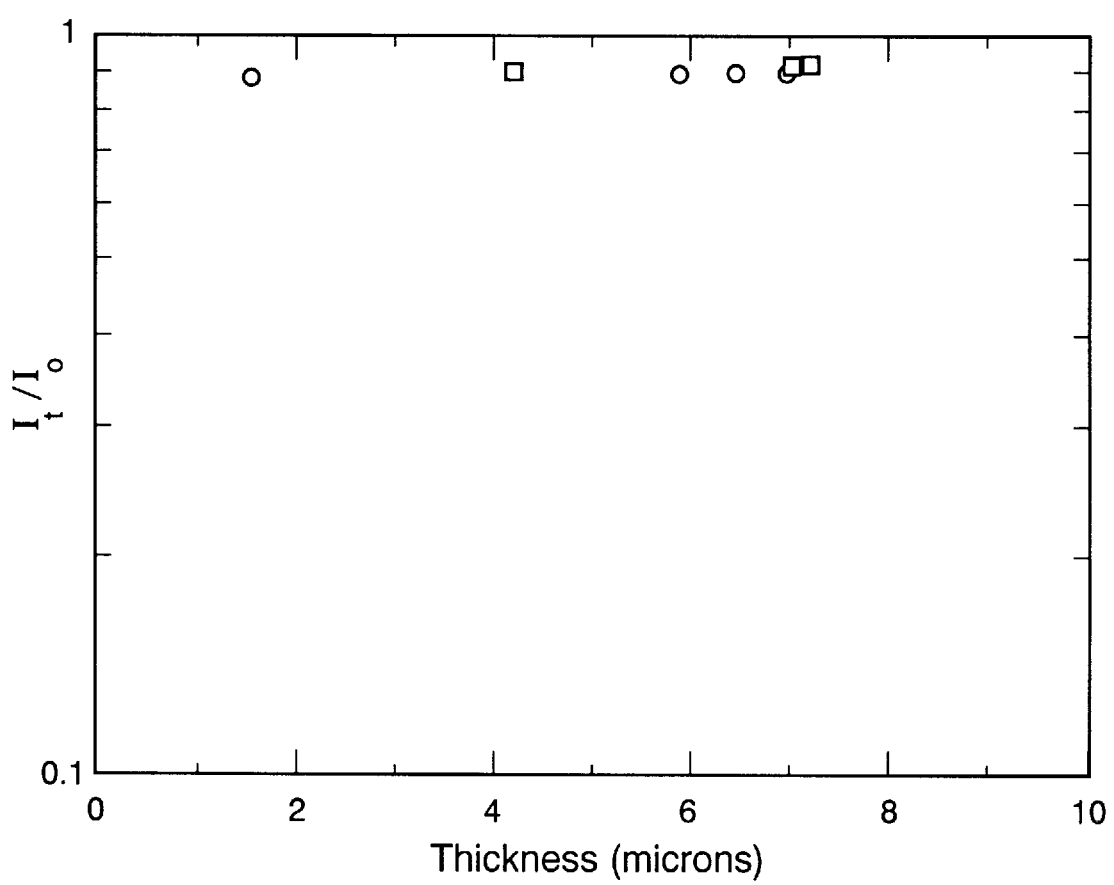
FIG. 7 illustrates the relative optical transmissions of BCO-PBZT (○) and DA-PBZT (□) thin films prepared by the solid-state coagulation process as a function of film thickness.

The percent optical transmissions of BCO-PBZT and DA-PBZT thin films prepared by the method of this invention are shown in FIG. 7 as a function of film thickness. The colorless rigid-rod polymer thin films exhibit no appreciable dependence of optical loss on film thickness, indicating that the optical loss from internal absorption and scattering is negligible compared to the optical loss from surface reflection. In order to determine the optical loss of the colorless rigid-rod polymers due to internal absorption and scattering, a much longer optical path is required. Techniques such as waveguide measurement may be used to determine the intrinsic absorption of the colorless rigid-rod polymers. By comparing the internal optical loss of the conjugated PBZT thin films with that of the nonconjugated BCO-PBZT and DA-PBZT thin films, it may be concluded that the optical transparency of PBZT thin films in the visible light region is limited by the intrinsic absorption of the polymer due to π electron conjugation.

Various modifications may be made in the instant invention without departing from the spirit and scope of the appended claims.

We claim:

1. A method for preparing optical quality, thin films of polymers and co-polymers, which comprises
   (a) preparing a 0.1 to about 5.0 weight percent solution of the polymer or co-polymer in a suitable solvent;
   (b) forming a film from the solution;
   (c) rapidly cooling the thus-formed film to a temperature below the freezing point of the solvent;
   (d) dissolving the solvent out of said film at a temperature below the melting point of the solvent; and
   (e) drying the film.

2. The method of claim 1 wherein said polymer is a rod-like, aromatic heterocyclic polymer.

3. The method of claim 2 wherein said polymer is a benzobisoxazole polymer.

4. The method of claim 2 wherein said polymer is a benzobisthiazole polymer.

5. The method of claim 2 wherein said polymer is a benzobisimidazole polymer.

6. The method of claim 4 wherein said polymer is poly(p-phenylene benzobisazole).

7. The method of claim 4 wherein said polymer is poly(4,4'-biphenylene benzobisazole).

8. The method of claim 4 wherein said polymer is poly(bicyclooctane benzobisthiazole).

9. The method of claim 4 wherein said polymer is poly(diamantane benzobisthiazole).

10. The method of claim 1 wherein said solvent is methanesulfonic acid.

11. The method of claim 1 wherein said solvent is polyphosphoric acid.

12. The method of claim 1 wherein said solvent is concentrated sulfuric acid.

13. The method of claim 1 wherein said solvent is dissolved out of said film with a non-solvent selected from the group consisting of methanol, ethanol, propanol, dimethyl ketone and methyl ethyl ketone.

14. The method of claim 1 wherein the film formed in step (b) has a thickness of about 50 to 1000 microns.

15. The method of claim 1 wherein the film formed in step (b) has a thickness of about 50 to 500 microns.

* * * * *